United States Patent
Muramoto

(10) Patent No.: US 12,141,339 B2
(45) Date of Patent: Nov. 12, 2024

(54) IMAGE GENERATION APPARATUS AND INFORMATION PRESENTATION METHOD

(71) Applicant: Sony Interactive Entertainment Inc., Tokyo (JP)

(72) Inventor: Junichi Muramoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 251 days.

(21) Appl. No.: 17/439,014

(22) PCT Filed: Apr. 16, 2020

(86) PCT No.: PCT/JP2020/016648
§ 371 (c)(1),
(2) Date: Sep. 14, 2021

(87) PCT Pub. No.: WO2020/218131
PCT Pub. Date: Oct. 29, 2020

(65) Prior Publication Data
US 2022/0147138 A1    May 12, 2022

(30) Foreign Application Priority Data

Apr. 23, 2019 (JP) ................................ 2019-082183

(51) Int. Cl.
*G06F 3/01* (2006.01)
*G02B 27/00* (2006.01)
(Continued)

(52) U.S. Cl.
CPC ......... *G06F 3/012* (2013.01); *G02B 27/0093* (2013.01); *G02B 27/0101* (2013.01);
(Continued)

(58) Field of Classification Search
CPC combination set(s) only.
See application file for complete search history.

(56) References Cited

U.S. PATENT DOCUMENTS 9,245,389 B2   1/2016   Sako
9,256,284 B2   2/2016   Hanaya
(Continued)

FOREIGN PATENT DOCUMENTS

| JP | 2014115457 A | 6/2014 |
| JP | 2014127987 A | 7/2014 |
| JP | 2018013562 A | 1/2018 |

OTHER PUBLICATIONS

International Search Report for corresponding PCT Application No. PCT/JP2020/016648, 4 pages, dated Jun. 23, 2020.

*Primary Examiner* — Shaheda A Abdin
(74) *Attorney, Agent, or Firm* — Matthew B. Dernier, Esq.

(57) ABSTRACT

In an image generation apparatus, a viewpoint information acquisition section acquires information regarding a viewpoint of a user wearing a head-mounted display. A real space information acquisition section acquires information regarding a real space where the user and an information provider are present. A viewpoint control section moves the viewpoint in display from a user's viewpoint to another person's viewpoint including an object present in the real space in a field of view. An image generation section generates an image relative to the determined viewpoint and outputs the image from an output section.

12 Claims, 7 Drawing Sheets

(51) Int. Cl.
*G02B 27/01* (2006.01)
*G06T 19/00* (2011.01)

(52) U.S. Cl.
CPC ....... *G02B 27/017* (2013.01); *G02B 27/0179* (2013.01); *G06T 19/006* (2013.01); *G02B 2027/014* (2013.01); *G02B 2027/0187* (2013.01)

(56) References Cited

U.S. PATENT DOCUMENTS

| | | | | |
|---|---|---|---|---|
| 2012/0038549 | A1* | 2/2012 | Mandella | G06F 3/011 |
| | | | | 345/156 |
| 2014/0160129 | A1* | 6/2014 | Sako | G06T 19/006 |
| | | | | 345/427 |
| 2014/0186002 | A1 | 7/2014 | Hanaya | |
| 2015/0130839 | A1* | 5/2015 | Kasahara | G06F 3/0304 |
| | | | | 345/633 |
| 2017/0282062 | A1* | 10/2017 | Black | A63F 13/25 |
| 2018/0196506 | A1* | 7/2018 | Nakashima | G06F 3/017 |

* cited by examiner

IMAGE GENERATION APPARATUS AND INFORMATION PRESENTATION METHOD

TECHNICAL FIELD

The present invention relates to an image generation apparatus for generating an image to be displayed on a head-mounted display and an information presentation method performed by the image generation apparatus.

BACKGROUND ART

Image display systems that allow appreciation of a target space from a free viewpoint have become pervasive. For example, developed is a system that displays a panoramic video image on a head-mounted display in such a manner that, as a user wearing the head-mounted display rotates his or her head, a panoramic image based on his or her line of sight is displayed. Using the head-mounted display makes it possible to increase a sense of immersion into the video image or improve operability of an application such as a game. Also developed is a walk-through system that allows the user wearing the head-mounted display to virtually walk around inside the space displayed as the video image, as he or she physically moves.

SUMMARY

Technical Problem

In the case of a shielded head-mounted display that keeps out external light, the user wearing the head-mounted display naturally cannot see what is going on outside. Accordingly, there is a possibility that the user may lose his or her sense of direction or move to an unintended position. Means of communication is limited for an outside person to convey such information as directions, making it necessary in some cases for the user to suspend the appreciation of the image or take off the head-mounted display.

The present invention has been devised in light of the foregoing, and it is an object of the present invention to provide a technology that allows an outside person to easily convey information to a user wearing a head-mounted display.

Solution to Problem

In order to solve the above problem, a mode of the present invention relates to an image generation apparatus. This image generation apparatus includes a viewpoint information acquisition section, a real space information acquisition section, a viewpoint control section, an image generation section, and an output section. The viewpoint information acquisition section acquires, on the basis of movement of a head of a user wearing a head-mounted display, information regarding a viewpoint of the user in question. The real space information acquisition section acquires, on the basis of information from a sensor that detects a state of a real space where the user is present, information regarding the state of the real space in question. The viewpoint control section controls a viewpoint relative to an image displayed on the head-mounted display. The image generation section generates an image representing a target to be displayed in a field of view corresponding to the viewpoint. The output section outputs the generated image to the head-mounted display. The viewpoint control section moves the viewpoint relative to the image to be displayed between the user's viewpoint and another person's viewpoint that is different from the user's viewpoint and that includes an object present in the real space in the field of view.

Another mode of the present invention relates to an information presentation method. This information presentation method includes a step of acquiring, on the basis of movement of a head of a user wearing a head-mounted display, information regarding a viewpoint of the user in question, a step of acquiring, on the basis of information from a sensor that detects a state of a real space where the user is present, information regarding the state of the real space in question, a step of controlling a viewpoint relative to an image displayed on the head-mounted display, a step of generating an image representing a target to be displayed in a field of view corresponding to the viewpoint, and a step of outputting the generated image to the head-mounted display. The step of controlling the viewpoint includes a step of moving the viewpoint relative to the image to be displayed between the user's viewpoint and another person's viewpoint that is different from the user's viewpoint and that includes an object present in the real space in the field of view.

It should be noted that any combination of the above components and conversions of expressions of the present invention between a method, an apparatus, a system, a computer program, a data structure, a recording medium, and the like are also effective as modes of the present invention.

Advantageous Effect of Invention

According to the present invention, it is possible for an outside person to easily convey information to a user wearing a head-mounted display.

DESCRIPTION OF EMBODIMENT

Figure 1:
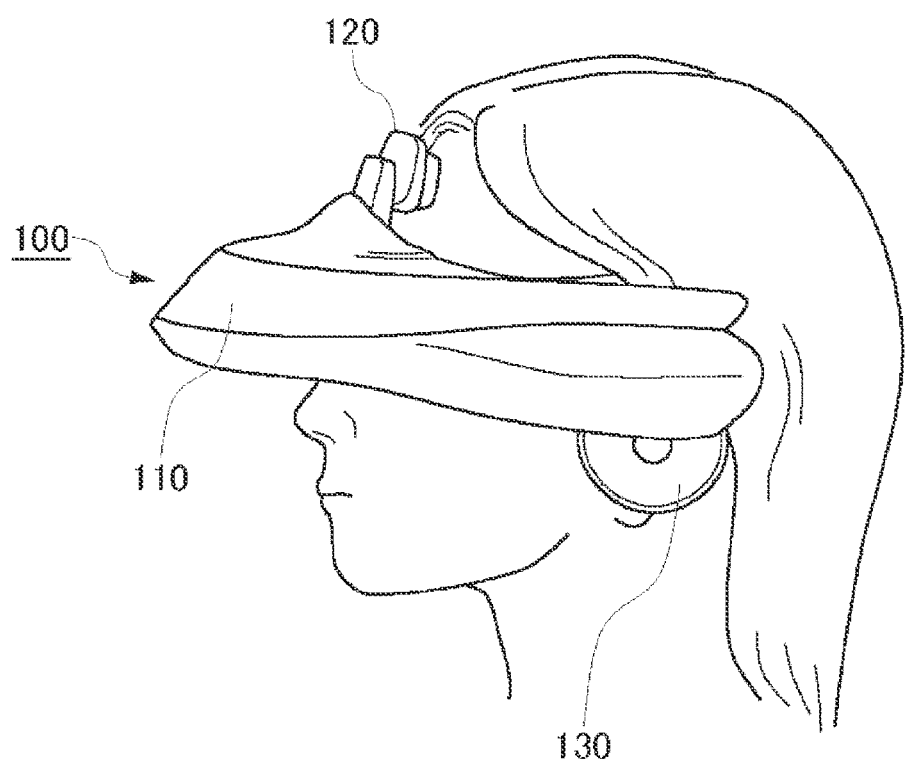
FIG. 1 is a diagram illustrating an example of appearance of a head-mounted display of the present embodiment.

FIG. 1 is a diagram illustrating an example of appearance of a head-mounted display 100. The head-mounted display 100 includes a main body section 110, a forehead contact section 120, and a temporal area contact section 130. The head-mounted display 100 is a display apparatus worn on the user's head for appreciating a still image or video displayed on a display and listening to voice, music, or the like output from a headphone. A motion sensor built into or externally attached to the head-mounted display 100 allows measurement of posture information of the head of the user wearing the head-mounted display 100 such as a rotational angle and tilt. This makes it possible to give the user a sense as if he or she is in an image world, by changing a field of view of a display image according to movement of the user's head.

It should be noted, however, that the head-mounted display of the present embodiment is not limited in shape or structure to that illustrated. For example, a camera may be provided on a front surface of the head-mounted display 100 to capture what is going on in a real space in a direction in which a user's face is oriented. In this case, it is possible to acquire the orientation of the user's face and the position of the user's head or obtain the position of a real object present in front, by analyzing a captured image. The captured image can also be used as the display image in question.

Figure 2:
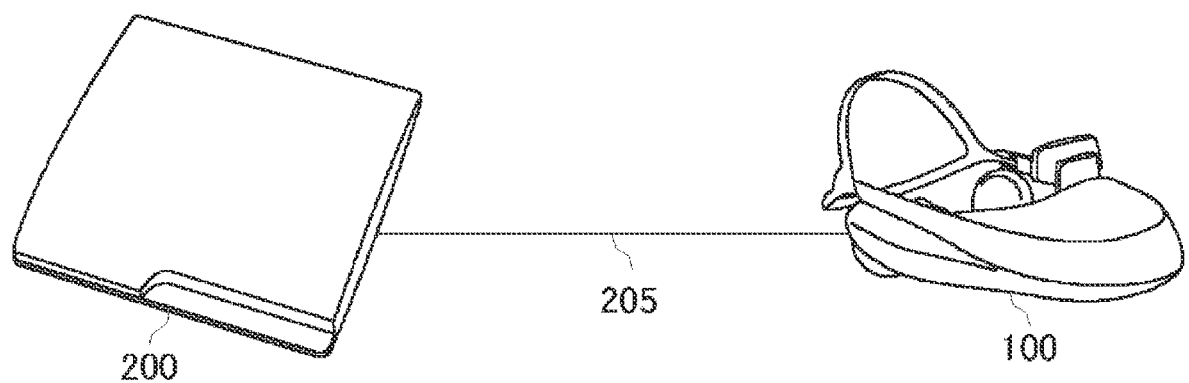
FIG. 2 is a configuration diagram of an information processing system of the present embodiment.

FIG. 2 is a configuration diagram of an information processing system of the present embodiment. The head-mounted display 100 is connected to an image generation apparatus 200 by wireless communication or an interface 205 that connects peripheral equipment such as a USB (Universal Serial Bus) to the image generation apparatus 200. The image generation apparatus 200 may be further connected to a server via a network. In that case, the server may provide online applications such as games in which a plurality of users can participate via the network to the image generation apparatus 200.

The image generation apparatus 200 determines the position of a virtual viewpoint and the direction of a line of sight relative to the display image, on the basis of the head position and posture of the user wearing the head-mounted display 100, generates the display image in such a manner that the field of view is based on the determined position and direction, and outputs the display image to the head-mounted display 100. To this extent, there may be various purposes for displaying the image. For example, the image generation apparatus 200 may generate, as the display image, a virtual world that forms the setting of an electronic game while at the same time causing the game to progress or may display a still image or video for appreciation regardless of whether the still image or video is of the virtual world or a real world.

It is possible to provide a sense of immersion into the image world by displaying an all-sky (360°) image over a wide range of angles around the virtual viewpoint. It should be noted that the image generation apparatus 200 may be a separate apparatus connected to the head-mounted display 100 by the interface 205 as illustrated in FIG. 2 or may be provided integrally inside the head-mounted display 100.

Figure 3:
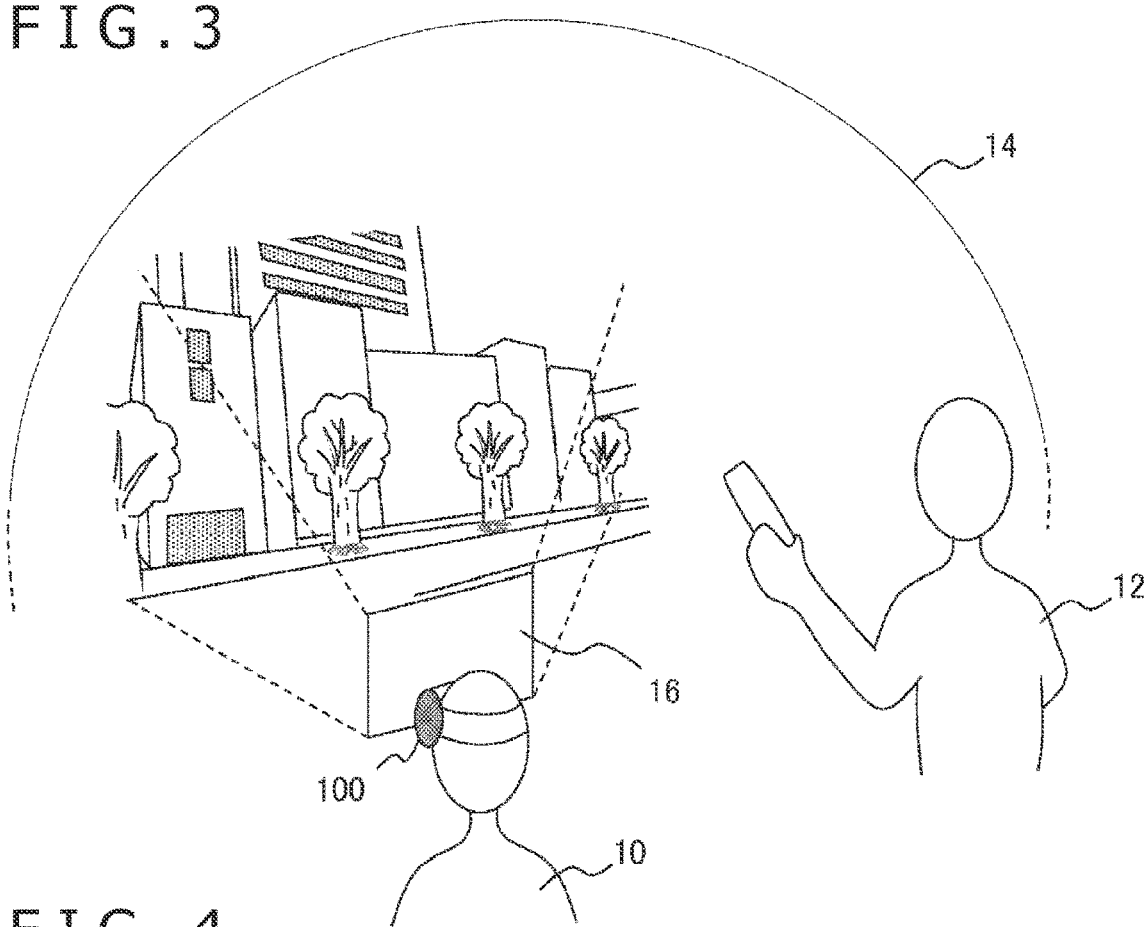
FIG. 3 is a diagram schematically illustrating an example of a manner of display to which the present embodiment is applicable.

FIG. 3 schematically illustrates an example of a manner of display to which the present embodiment is applicable. A user 10 is wearing the head-mounted display 100. The image to be displayed is, for example, an all-sky image, and FIG. 3 illustrates, with a spherical surface 14, the range represented by the image. It should be noted, however, that this does not intend to limit the target to be displayed to the all-sky image. Also, the target to be displayed may be a photographed image captured in advance, a three-dimensional virtual world where a virtual object is present, or the like. Further, the target to be displayed may be a still image or video.

The image generation apparatus 200 causes the head-mounted display 100 to display an image commensurate with the position and posture of the head of the user 10 wearing the head-mounted display 100, and by extension, the position of his or her viewpoint and the direction of his or her line of sight. More specifically, the image generation apparatus 200 generates the display image by setting a view screen 16 in the virtual space to be displayed, on the basis of information regarding the position and posture of the head of the user 10, and projecting the image to be displayed or a three-dimensional object.

It is possible to display the image in the field of view corresponding to the user's viewpoint by acquiring the position of the viewpoint of the user 10 and the direction of his or her line of sight (hereinafter, these may comprehensively be referred to as the "viewpoint") at a given rate and changing the position and direction of the view screen 16 according to the acquired position and direction. It is also possible to render the space to be displayed stereoscopically by generating a stereo image having parallax and displaying the stereo image on the head-mounted display 100 in front of left and right eyes. This makes it possible, for example, to experience a simulated trip to a desired place or perceive a sense of being at a practically inaccessible location or a fictitious location.

It is possible to provide a higher sense of immersion to the user 10 by realizing the display of the image in this manner with the shielded head-mounted display 100 as illustrated in FIG. 1. Meanwhile, wearing the head-mounted display 100 is problematic because one cannot see what is going on outside. For example, in the case where a person 12 near the user 10 intends to say something to the user 10, possible means would be to notify the user 10 by a touch or voice. However, there is a limit on content of information one can convey by using such means.

For example, there is a case where the person 12, who is a guide, intends to guide guests to look in a desired direction in the image world to be displayed, during a tourist information service, an attraction for virtual experience, presentation of merchandise, or the like. At this time, it is difficult to properly express the direction by voice alone. In particular, if there are a plurality of such guests as the user 10 for a single guide, the guests are likely to be looking in various directions, making it difficult to express the desired direction in a uniform manner.

Other possible means would be to superimpose an arrow or other mark on the image so as to allow the user 10 to objectively understand the direction. However, part of the image seen by the user 10 may be hidden, possibly causing the user 10 to feel that the arrow is bothersome. Further possible means would be to display the captured image of the real world on the head-mounted display 100. However, a complete change from the image which the user 10 has been looking at up to then results in interruption of the sense of immersion. Also, it is difficult to understand positional and directional relations between the captured image and the image which the user 10 has been looking at up to then.

Accordingly, in the present embodiment, a region where the user 10 himself or herself is present is included in the field of view by moving the virtual viewpoint relative to the display image to a position different from that of the viewpoint of the user 10 during a time period in which the outside person 12 who is not wearing the head-mounted display 100 conveys information. For example, the user 10 is enabled to see himself or herself and the person 12 (to be precise, the virtual object which is an avatar), by moving the virtual viewpoint in such a manner that the user 10 and the outside person 12 come within the field of view. This makes it possible for the user 10 to intuitively understand the positional relation and direction between the user 10 himself or herself and the person 12.

Also, in the case where the person 12 indicates the direction with a laser pointer or other tool, the position and direction indicated by the pointer in question are also brought into the field of view, thus causing the user 10 to face the specified direction in a natural manner. It should be noted that, in the description which will be given below, the person 12 who will give some kind of information to the user 10 wearing the head-mounted display 100 will be referred to as an "information provider." Here, the term "information" may refer not only to the direction to which the line of sight should be directed as described above but also any kind of information conveyed by gesture or other means.

Figure 4:
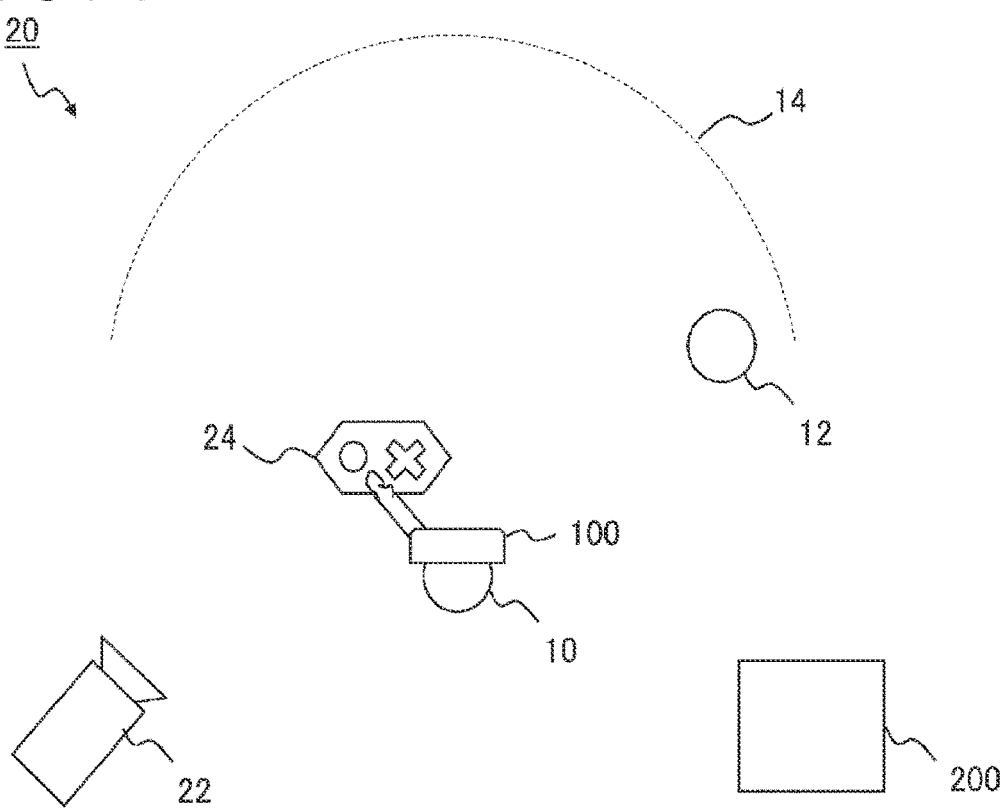
FIG. 4 is a diagram schematically illustrating an example of a system configuration for realizing the present embodiment.

FIG. 4 is a diagram schematically illustrating an example of a system configuration for realizing the present embodiment. A system configuration 20 illustrated represents the state in which the environment illustrated in FIG. 3 is seen in a bird's eye view. That is, the user 10 wearing the head-mounted display 100 and the information provider 12 are present in the same space. The image generation apparatus 200 generates, of the image represented by the spherical surface 14, the display image within the field of view according to the head position and the orientation of the face of the user 10 and sends the display image to the head-mounted display 100. This makes it possible for the user 10 to see the images in a variety of directions depending on the movement of the viewpoint and line of sight.

Further, the system configuration 20 of this example includes a sensor 22 for detecting the state of the real space and an input apparatus 24 to be manipulated by the user 10. The sensor 22 is not limited in type as long as it is an apparatus capable of detecting the position or state of an object present in the real space such as a monocular or multiocular camera that captures a visible light silhouette, a TOF (Time of Flight) camera that shines infrared rays and detects reflected light thereof, a sensor that detects luminous bodies having given wavelength bands that are worn by the user 10 and the information provider 12, or a thermography camera.

The image generation apparatus 200 determines the viewpoint relative to the display image during the time period in which the information provider 12 provides information, on the basis of information from the sensor 22. Hereinafter, the viewpoint determined in such a manner will be referred to as an "other person's viewpoint." During the time period in which the information provider 12 provides information, the input apparatus 24 accepts operation for moving the viewpoint toward the display image from the user's viewpoint to the other person's viewpoint and operation for moving the viewpoint toward the display image from the other person's viewpoint back to the user's viewpoint. The input apparatus 24 may be a common input apparatus such as a remote control, a game controller, a mobile terminal, a pushbutton, a joystick, a mouse, or a keyboard.

For example, if the information provider 12 gives a verbal instruction as to in which direction one should look such as "look here," the user 10 starts moving the viewpoint by manipulating given input means of the input apparatus 24 at a suitable timing. Then, the user 10 who has recognized the direction specified by the information provider 12 by looking at the image from the other person's viewpoint can turn his or her body toward the direction in question in a natural manner. The user 10 can see the image in the direction specified by the information provider 12, by performing the operation for moving the viewpoint back to the user's own viewpoint in that state.

Enabling the user 10 to control the movement of the viewpoint himself or herself even if the information provider 12 gives an instruction can keep stress caused by unintended movement of the viewpoint to a minimum. Motion sickness caused by the movement of the viewpoint against one's will can also be prevented. It should be noted, however, that, depending on the case, the information provider 12 may move the viewpoint by manipulating the input apparatus 24. Also, the image generation apparatus 200 moves the viewpoint gradually according to the operation for starting or terminating the movement of the viewpoint and displays the images that can be seen on a route thereof. This clarifies the relation between the image seen up to then and the image from the other person's viewpoint, thus making space perception easier.

It should be noted that the shapes and positions of the sensor 22 and the input apparatus 24 are not limited to those illustrated. For example, the sensor 22 may be installed in a manner seeing, in a bird's eye view, the inside of a room from a ceiling or may be movable. Also, the input apparatus 24 may be a motion sensor built into the head-mounted display 100 and acquire the operation made by the movement of the head of the user 10. In any case, the image generation apparatus 200 is connected to both the sensor 22 and the input apparatus 24 in a wired or wireless manner and acquires information sent from each at any time.

Figure 5:
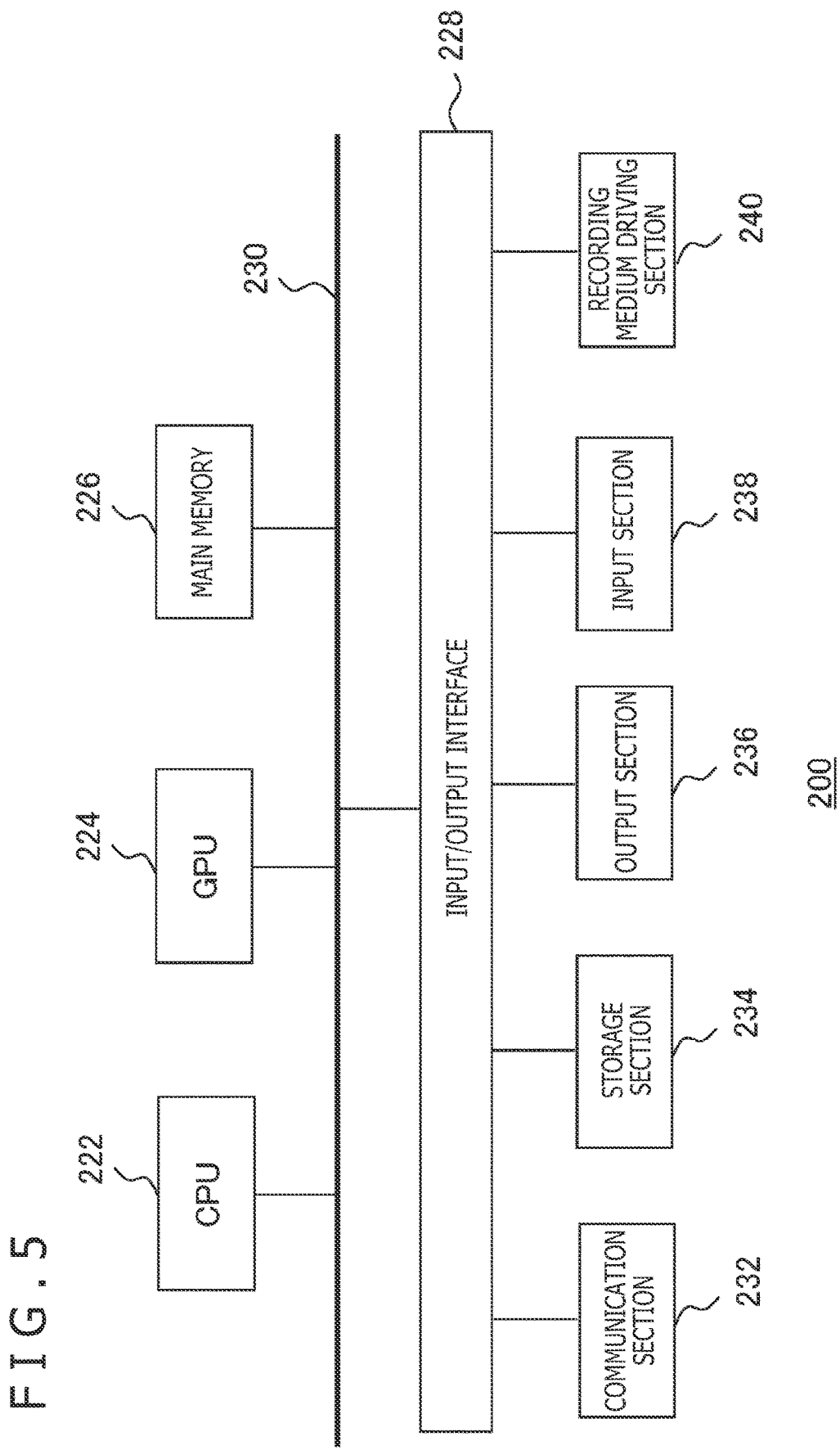
FIG. 5 is a diagram illustrating a configuration of internal circuitry of an image generation apparatus of the present embodiment.

FIG. 5 illustrates a configuration of internal circuitry of the image generation apparatus 200. The image generation apparatus 200 includes a CPU (Central Processing Unit) 222, a GPU (Graphics Processing Unit) 224, and a main memory 226. These sections are connected to each other via a bus 230. An input/output interface 228 is further connected to the bus 230.

A communication section 232, a storage section 234, an output section 236, an input section 238, and a recording medium driving section 240 are connected to the input/output interface 228. The communication section 232 includes a peripheral interface such as a USB or IEEE (Institute of Electrical and Electronics Engineers) 1394 and a wired or wireless LAN (Local Area Network) network interface. The storage section 234 is a hard disk drive, a non-volatile memory, or the like. The output section 236 outputs data to the head-mounted display 100. The input section 238 receives data inputs from the head-mounted display 100, the sensor 22, and the input apparatus 24. The recording medium driving section 240 drives a removable recording medium such as a magnetic disc, an optical disc, or a semiconductor memory.

The CPU 222 controls the image generation apparatus 200 as a whole by executing an operating system stored in the storage section 234. The CPU 222 also executes various programs read from a removable recording medium and loaded into the main memory 226 or downloaded via the communication section 232. The GPU 224 has a geometry engine function and a rendering processor function, performs a drawing process in accordance with a drawing instruction from the CPU 222, and stores the display image in a frame buffer which is not illustrated. Then, the GPU 224 converts the display image stored in the frame buffer into a video signal and outputs the video signal to the output section 236. The main memory 226 includes a RAM (Random Access Memory) and stores the programs and data required for processing.

Figure 6:
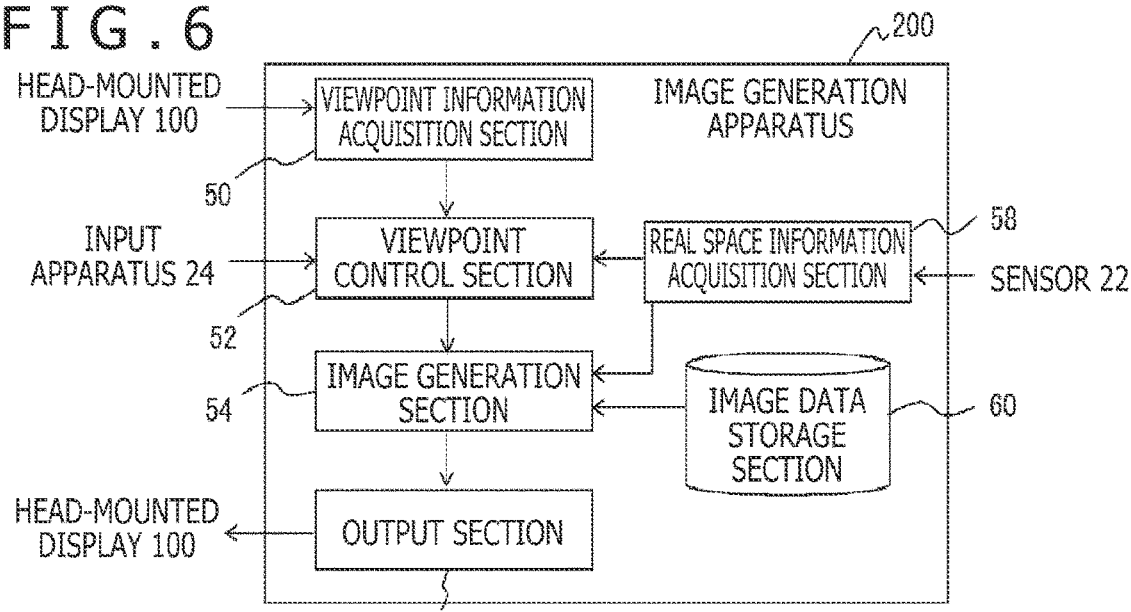
FIG. 6 is a diagram illustrating a configuration of functional blocks of the image generation apparatus in the present embodiment.

FIG. 6 illustrates a configuration of functional blocks of the image generation apparatus 200 in the present embodiment. Although the image generation apparatus 200 may perform common information processing tasks such as causing the electronic game to progress and communicating with the server as described above, in FIG. 6, focus is placed on its function to control the display image when the information provider provides information. It should be noted that, of the functions of the image generation apparatus 200 illustrated in FIG. 6, at least some may be implemented in the head-mounted display 100. Alternatively, at least some of the functions of the image generation apparatus 200 may be implemented in the server connected to the image generation apparatus 200 via the network.

Also, the functional blocks illustrated in FIG. 6 can be realized by hardware such as the CPU, GPU, various memories, and other components illustrated in FIG. 5 or can be realized by software such as programs loaded into the memory from the recording medium and the like that deliver such functions of data input, data retention, image processing, communication, and the like. Accordingly, it is understood by a person skilled in the art that these functional blocks can be realized in various ways including hardware alone, software alone, and a combination thereof, and the functional blocks are not limited to any one of them.

The image generation apparatus 200 includes a viewpoint information acquisition section 50, a viewpoint control section 52, a real space information acquisition section 58, an image generation section 54, an image data storage section 60, and an output section 56. The viewpoint information acquisition section 50 acquires information regarding the user's viewpoint. The viewpoint control section 52 controls the viewpoint relative to the display image. The real space information acquisition section 58 acquires the state of the real space. The image generation section 54 generates the display image. The image data storage section 60 stores image data required for generation of the display image. The output section 56 outputs the display image to the head-mounted display 100.

The viewpoint information acquisition section 50 includes the input section 238 and the CPU 222 illustrated in FIG. 5 and the like and acquires the position of the user's viewpoint and the direction of his or her line of sight at a given rate. For example, the viewpoint information acquisition section 50 sequentially acquires an output value of an acceleration sensor built into the head-mounted display 100, thus acquiring the posture of the head. The position of the head in the real space may be acquired by providing an unillustrated light-emitting marker outside the head-mounted display 100 and acquiring the captured image thereof from an unillustrated imaging apparatus.

Alternatively, an unillustrated camera for capturing the image corresponding to the user's field of view may be provided on the side of the head-mounted display 100 to acquire the position and posture of the head by means of SLAM (Simultaneous Localization and Mapping) or other technology. If the position and posture of the head becomes clear, it is possible to approximately identify the position of the user's viewpoint and the direction of his or her line of sight. It is understood by a person skilled in the art that various other techniques are possible for the method of acquiring information regarding the user's viewpoint in addition to the one mentioned above.

The real space information acquisition section 58 is realized by the input section 238 and the CPU 222 illustrated in FIG. 5, acquires a detection result sent from the sensor 22, and acquires at least any one of pieces of information including the positions of the user 10 and the information provider 12 in the real space and the position and direction specified by the information provider 12. The real space information acquisition section 58 may further acquire the directions in which the faces of the user 10 and the information provider 12 are oriented, the movements of their bodies, and their postures and motions. For example, it is widely known that these pieces of information can be acquired by analyzing the captured image.

The more information the real space information acquisition section 58 acquires, the more in detail the real space displayed when the viewpoint is moved to the other person's viewpoint can be represented, and the more helpful it is for the user to understand the state. Meanwhile, in the case where it is simply sufficient to understand the positional relation with respect to the information provider, it is probably more advantageous in terms of a processing burden and display delay to simply represent the real space with simple graphics. Accordingly, information to be acquired by the real space information acquisition section 58 is selected as appropriate, according to details of information to be acquired from the information provider and processing capability of the image generation apparatus 200. Also, it is desirable to properly select the type of the sensor 22 according to the above.

The viewpoint control section 52 is determined by the input section 238 and the CPU 222 illustrated in FIG. 5 and determines the position of the virtual viewpoint and the direction of the line of sight relative to the display image at a given rate. Basically, the viewpoint control section 52 determines the viewpoint and line of sight relative to the display world in such a manner that they correspond to the user's viewpoint and the direction of his or her line of sight acquired by the viewpoint information acquisition section 50. Meanwhile, if the user performs the operation for moving the viewpoint during the time period in which the information provider provides information, the viewpoint is moved to the other person's viewpoint determined by a given rule.

For example, the position of the other person's viewpoint and the line of sight thereof are determined in such a manner that at least one of the user himself or herself, the information provider, and the position and direction indicated by the information provider comes within the field of view. Accordingly, the viewpoint control section 52 retains therein the rule for determining the other person's viewpoint based on the positions of the user and the information provider at that moment acquired by the real space information acquisition section 58. The viewpoint control section 52 starts moving the viewpoint from the user's viewpoint to the other person's or moving the viewpoint from the other person's viewpoint to the user's viewpoint, using acceptance of the operation for moving the viewpoint by the input apparatus 24 as a trigger. The image generation section 54 is realized by the CPU 222, the GPU 224, and the main memory 226 illustrated in FIG. 5 and the like and generates not only a virtual three-dimensional space to be displayed but also the display image corresponding to the viewpoint determined by the viewpoint control section 52 at the given rate.

That is, the image generation section 54 generates the display image by setting the view screen in such a manner that the view screen corresponds to the viewpoint determined by the viewpoint control section 52 and projecting the image and virtual objects to be displayed onto the viewscreen in question. As a result, the virtual objects representing the user 10 and the information provider 12 are included in the field of view from the other person's viewpoint. The virtual objects in question are arranged in such a manner as to correspond to the actual positions and orientations acquired by the real space information acquisition section 58. In the case where the information provider indicates the positions and directions with the laser pointer or other tool, the virtual objects and graphics representing the positions and directions are also arranged. In the case where stereoscopy is realized by using the stereo image, the image generation section 54 generates images for the left and right eyes by setting the view screens for the left and right eyes, respectively.

The image data storage section 60 is realized by the main memory 226 illustrated in FIG. 5 and stores image data required for generation of the display image. For example, the image data storage section 60 stores 3D (Three Dimensional) models of the virtual objects representing the user and the information provider together with the 3D models of the all-sky image and the virtual world to be displayed during normal appreciation of images. The output section 56 includes the CPU 222, the main memory 226, and the output section 236 illustrated in FIG. 5 and the like and sends the data of the display image generated by the image generation section 54 to the head-mounted display 100 at the given rate.

In the case where the image generation section 54 generates the stereo images for stereoscopy, the output section 56 generates an image obtained by connecting these images horizontally as the display image. In the case of the head-mounted display 100 configured in such a manner that the display image is appreciated through a lens, the output section 56 performs, on the display image, correction that takes into consideration distortion caused by the lens in question.

Figure 7:
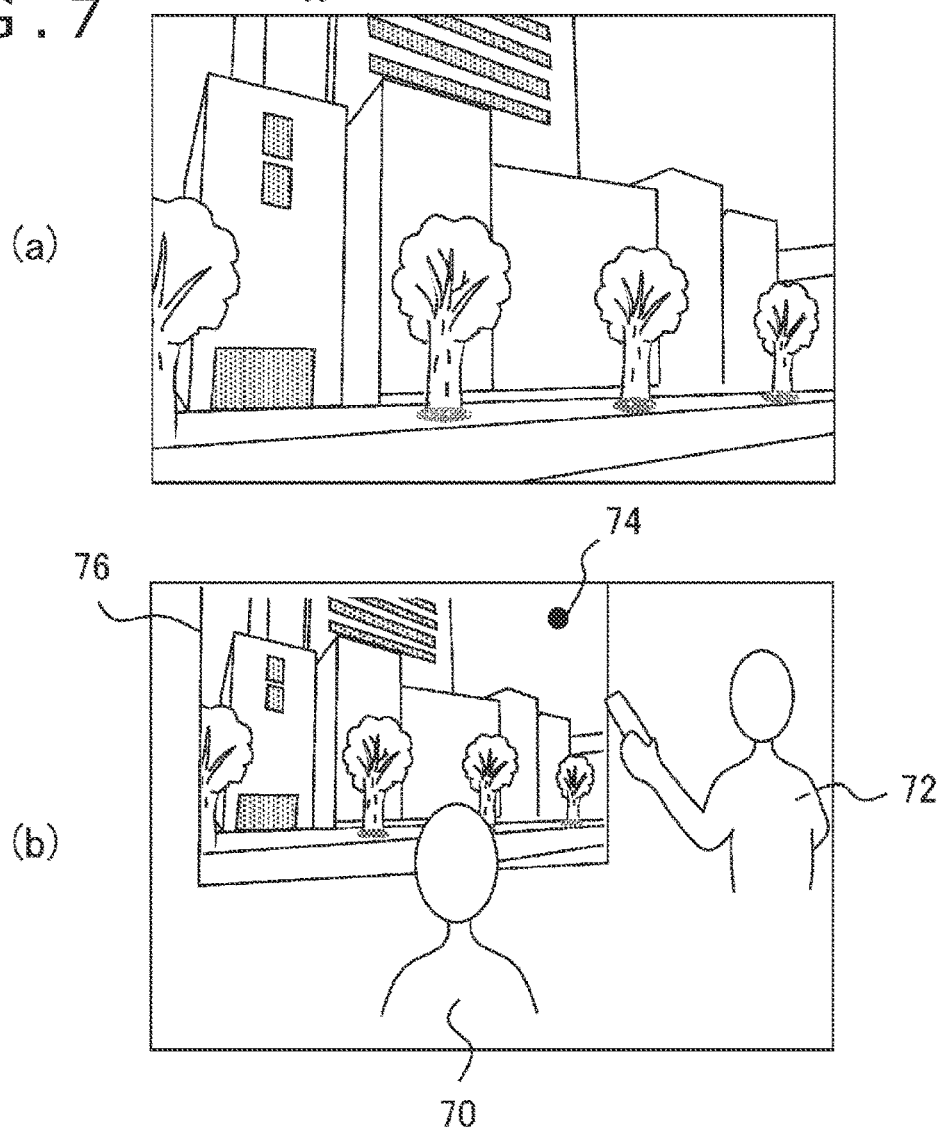
FIG. 7 depicts diagrams illustrating a change between display images from a user's viewpoint and another person's viewpoint in the present embodiment.

FIG. 7 depicts diagrams illustrating a change between the display images from the user's viewpoint and the other person's viewpoint. In FIG. 7, (a) is the image displayed from the user's viewpoint which is equivalent, of the image of a townscape to be displayed, to the range of the user's field of view. In the case of the head-mounted display 100, in practice, the user can have a sense as if he or she is actually in the town as a result of visual recognition of the image in question over the user's entire field of view, for example, by enlargement of the image by an eyepiece. Also, it is possible to render the images stereoscopic by displaying the stereo images having parallax on the right and left.

Illustrated by (b) is the image displayed from the other person's viewpoint depicting a user's object 70, an information provider's object 72, and a graphics 74 representing the position indicated by the information provider with the pointer. In the example illustrated, a screen surface 76 representing the image seen by the user up to then from his or her own viewpoint is also included in the field of view. It should be noted, however, that the target to be included in the display image from the other person's viewpoint may vary depending on details of information to be conveyed, as described above. In the case of (b), the other person's viewpoint is set at a position slightly backward from the user's viewpoint in (a).

At this time, the image generation apparatus 200 gradually transitions the display image from the image in (a) to that in (b) by displaying also the images on a movement route of the viewpoint. The user's object 70 and the information provider's object 72 may be graphics that permit understanding of no more than the positional relation or detailed objects representing the orientation and motion of the face. Further, the image to be displayed may be displayed to stretch over a wider range from the other person's viewpoint rather than restricting the field of view to that displayed up to then based on the user's viewpoint as in the screen surface 76.

In any case, it is possible for the user to check, without taking off the head-mounted display 100, in which direction the information provider is present, which position or direction he or she is indicating, what kind of motion he or she is making, and the like by displaying the image including the user himself or herself from the other person's viewpoint as illustrated in (b). Also, it is possible to check necessary information without interrupting a world view of an original image, return to the user's viewpoint again, and resume the appreciation of the original image in a natural manner by continuously moving the viewpoint from the image seen from the user's viewpoint up to then.

Figure 8:
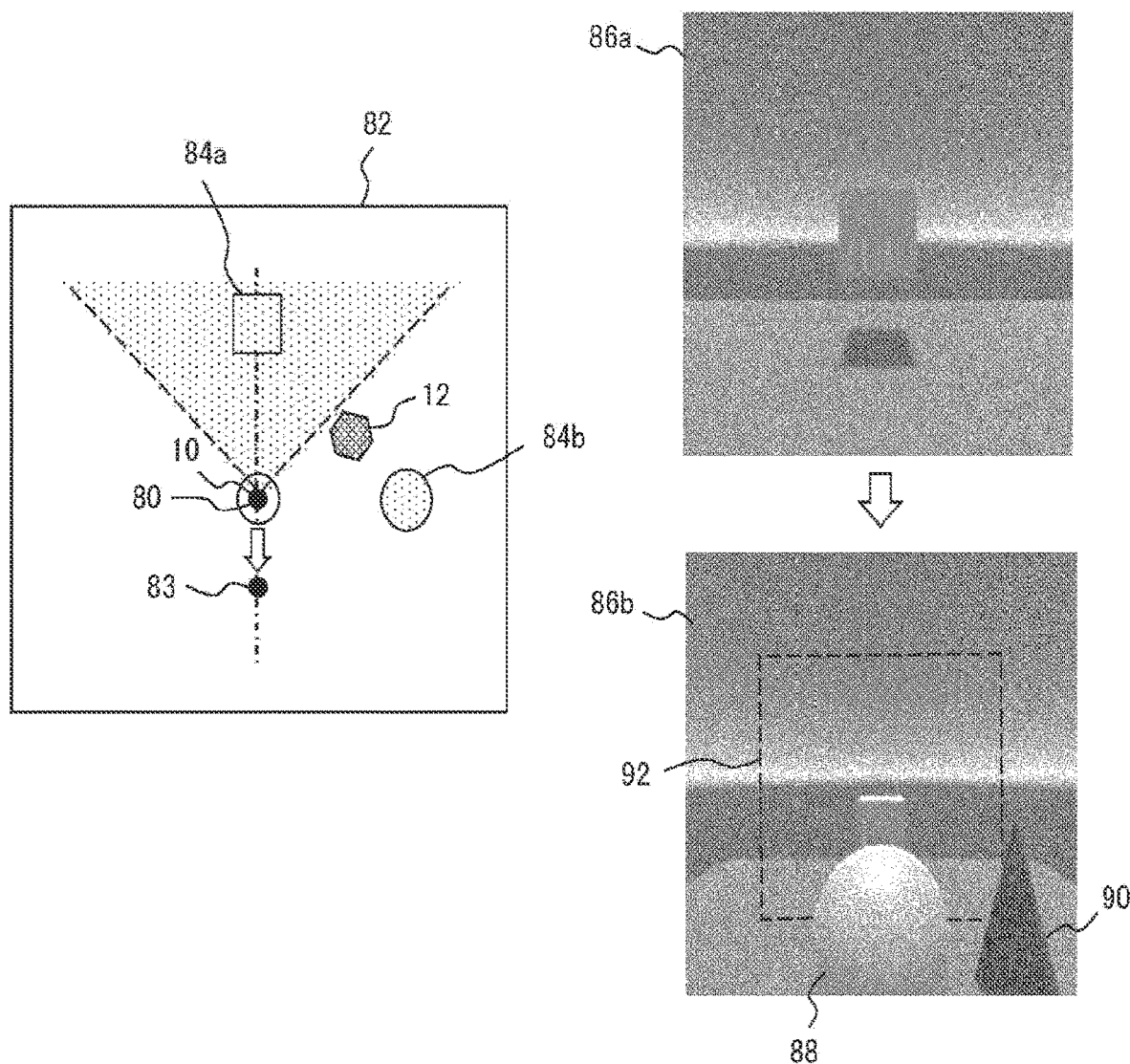
FIG. 8 is a diagram illustrating an example of movement of the viewpoint from the user's viewpoint to the other person's viewpoint in the present embodiment.

FIG. 8 illustrates an example of movement of the viewpoint from the user's viewpoint to the other person's viewpoint. In this example, the target to be displayed is the virtual three-dimensional space. A bird's eye view 82 illustrates the state in which the space including virtual objects 84a and 84b present in the virtual three-dimensional space in question and the user 10 is seen in a bird's eye view. Before moving to the other person's viewpoint, a viewpoint 80 is located at the position of the head of the user 10, and a viewing angle thereof is represented by a shaded triangle. In the real space, the information provider 12 is present in front and on the right of the user 10. At this point, however, the information provider 12 is not included in the field of view.

As a result, only an object present in the virtual space such as an image 86a is displayed on the head-mounted display 100. If the operation for moving the viewpoint to the other person's viewpoint is performed in this state, the viewpoint control section 52 determines an other person's viewpoint 83 to be located behind the user 10 in such a manner that both the user 10 and the information provider 12 come within the field of view. The other person's viewpoint 83 allows an image such as an image 86b including an object 88 (sphere in FIG. 8) of the user 10 and an object 90 (cone in FIG. 8) of the information provider 12 to be displayed. It should be noted that an angle of view 92 corresponding to the image 86a before the movement of the viewpoint is also illustrated in the image 86b.

Figure 9:
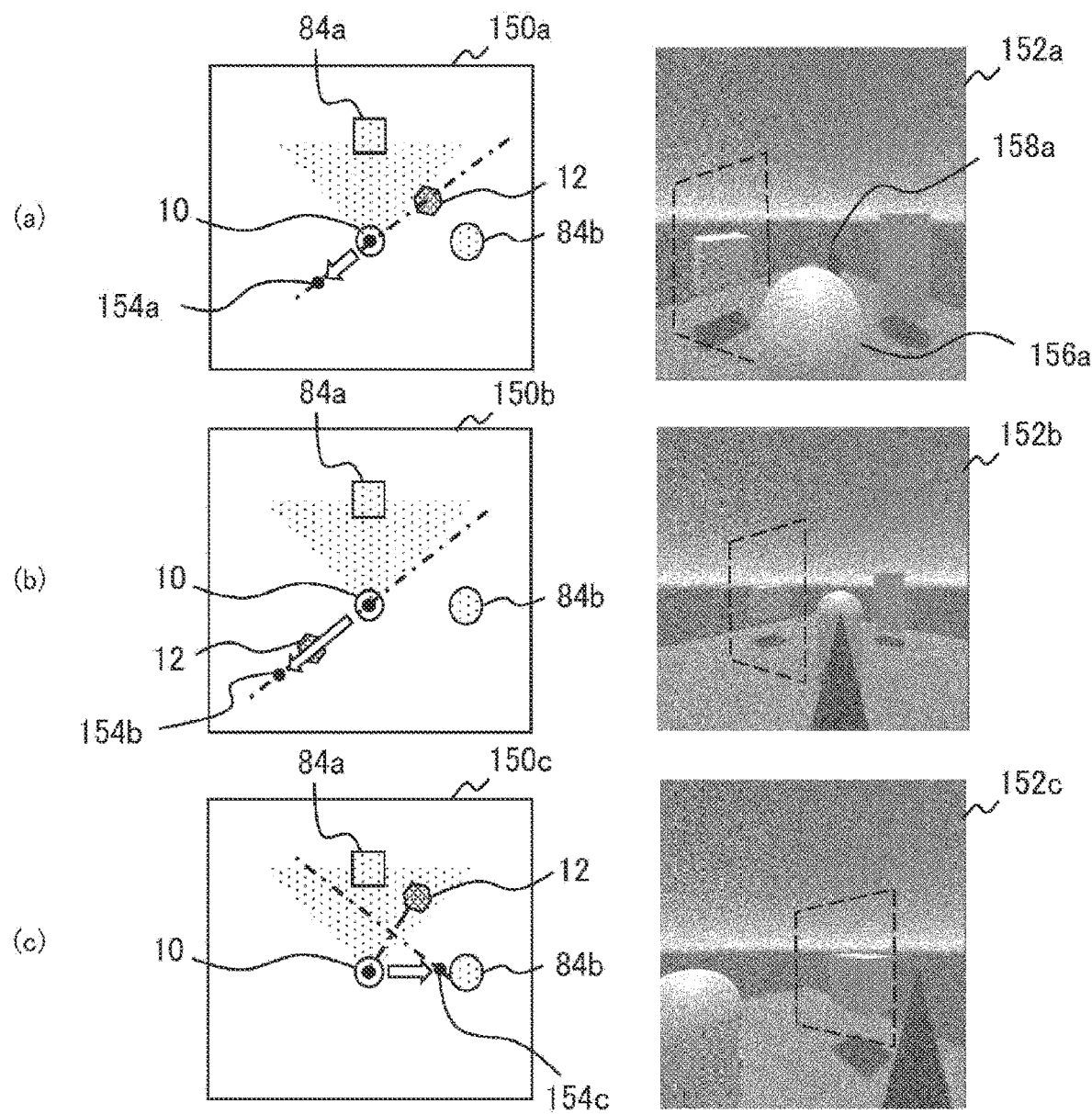
FIG. 9 depicts diagrams illustrating another example of movement of the viewpoint from the user's viewpoint to the other person's viewpoint in the present embodiment.

FIG. 9 depicts diagrams illustrating another example of movement of the viewpoint from the user's viewpoint to the other person's viewpoint in the present embodiment. All of (a), (b), and (c) illustrate bird's eye views 150a, 150b, and 150c of the spaces including the virtual objects 84a and 84b, the user 10, and the information provider 12 and display images 152a, 152b, and 152c from respective other person's viewpoints 154a, 154b, and 154c, as with the case of FIG. 8. In the case of (a), the user 10 and the information provider 12 are in the same positional relation as in the case of FIG. 8. However, because another condition has been added to determine the other person's viewpoint, the other person's viewpoint 154a is located at a different position.

For example, there are cases where the viewpoint from which the objects of the user 10 and the information provider 12 can be seen are limited depending on settings of the virtual world such as the case where there is a shield such as a wall near the positions in the virtual world corresponding to those of the user 10 and the information provider 12. Thus, the viewpoint control section 52 determines the other person's viewpoint by adding a condition that neither the user 10 nor the information provider 12 is hidden by the objects represented in the virtual world to a condition that both the user 10 and the information provider 12 come within the field of view. Accordingly, the viewpoint control section 52 acquires information regarding the three-dimensional space to be displayed from the image generation section 54 and determines the other person's viewpoint under the above conditions.

In the example illustrated, the other person's viewpoint 154a is set on the opposite side of the information provider 12 with the user 10 therebetween. As a result, displayed is the display image 152a in which a user's object 156a and an information provider's object 158a are visible. In the case of (b), the information provider 12 is present behind the user 10. In this case, one possibility is that the other person's viewpoint may be determined to be located behind the information provider 12 or in front of the user 10 as illustrated. More specifically, the other person's viewpoint is determined to be located on a line passing through the user 10 and the information provider 12 or in a region within a given range from the line in question. Alternatively, the other person's viewpoint may be determined to be located on an extension of the line of sight of the user or in a region within a given range from the line in question.

According to such conditions, there is a higher possibility that both objects of the user 10 and the information provider 12 will be included in the field of view without being hidden by any shield, as in the display image 152b. It should be noted that the other person's viewpoint is determined under similar conditions also in the example illustrated in (a). In the case of (c), the information provider is also in the field of view at the original viewpoint of the user 10. In this case, the other person's viewpoint is determined in such a manner that the user 10 is further included in the field of view. For example, the other person's viewpoint is determined on condition that it is located on the line that vertically bisects a line segment connecting the user 10 and the information provider 12 or in the region within the given range from the line in question. This makes it possible to include both objects of the user 10 and the information provider 12 in the field of view as in the display image 152c. It should be noted that the viewpoint is not limited to the two-dimensional movement as illustrated and that the other person's viewpoint may be determined in the three-dimensional space such as above the user 10.

Figure 10:
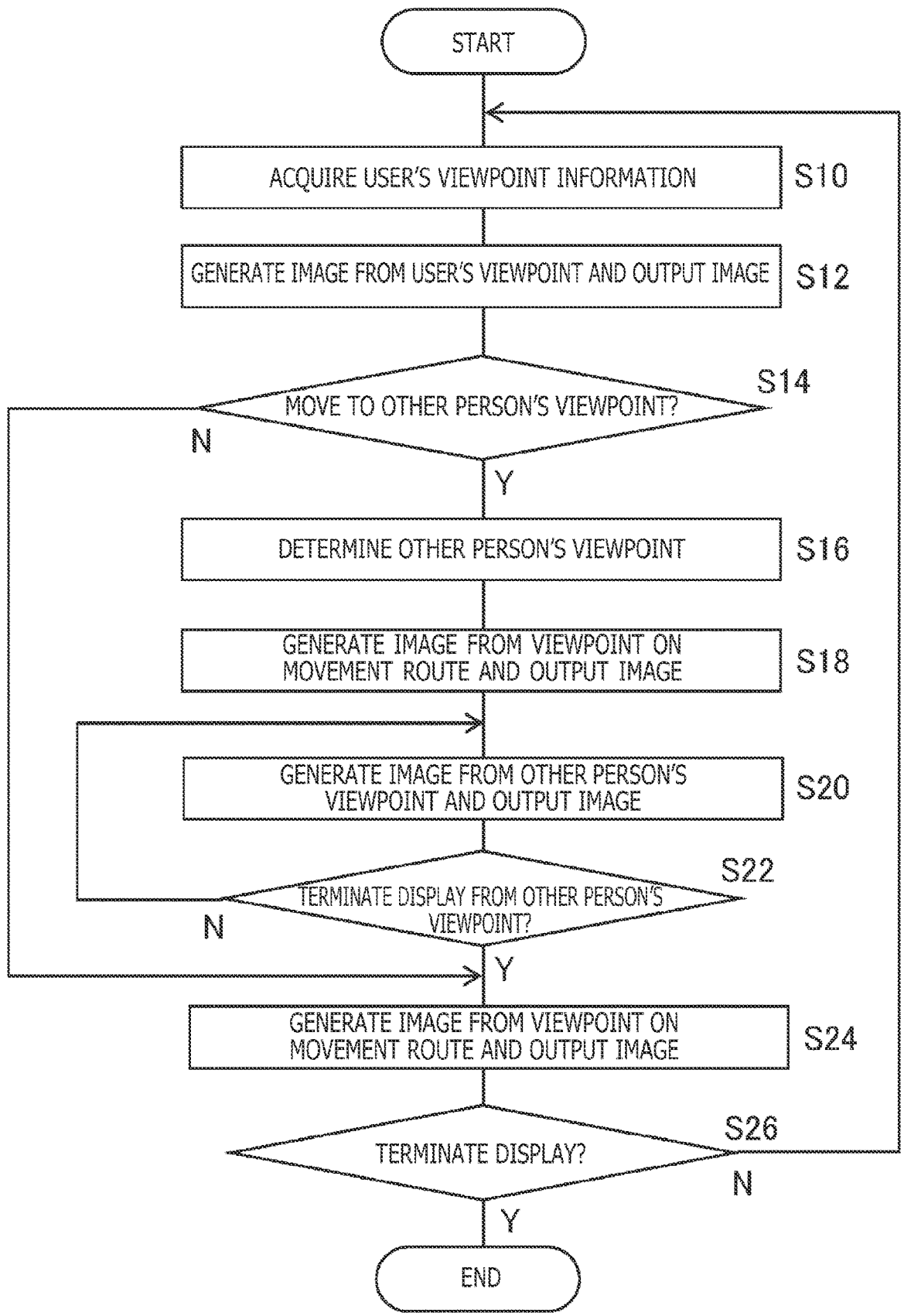
FIG. 10 is a flowchart illustrating a sequence of processes performed by the image generation apparatus to generate a display image and display the image on the head-mounted display in the present embodiment.

A description will next be given of operation of the image generation apparatus 200 that can be realized by the above configuration. FIG. 10 is a flowchart illustrating a sequence of processes performed by the image generation apparatus 200 to generate the display image and display the image on the head-mounted display 100 in the present embodiment. This flowchart starts when the image generation apparatus 200 establishes communication with the head-mounted display 100, the input apparatus 24, and the sensor 22 after the user has put on the head-mounted display 100. Here, the head-mounted display 100 sends a measured value of the motion sensor to the image generation apparatus 200. The sensor 22 sends given data regarding the real space to the image generation apparatus 200.

In that state, the viewpoint information acquisition section 50 of the image generation apparatus 200 acquires viewpoint information such as the position of the user's viewpoint and the direction of his or her line of sight on the basis of the measured value of the motion sensor sent from the head-mounted display 100 (S10). Then, the viewpoint control section 52 sets the user's viewpoint in question as the viewpoint relative to the target to be displayed, followed by generation of the display image corresponding to the viewpoint in question by the image generation section 54, thus causing the output section 56 to output the data of the display image (S12). This allows visual recognition of the image world of the target to be displayed as illustrated in (a) of FIG. 7.

While the operation for moving the viewpoint to the other person's viewpoint is yet to be performed (N in S14), the display image from the user's viewpoint continues to be generated and output (S10 and S12) unless it becomes necessary to terminate the image display (N in S26). When the operation for moving the viewpoint to the other person's viewpoint is accepted via the input apparatus 24 (Y in S14), the viewpoint control section 52 determines the position of the other person's viewpoint and the line of sight thereof (S16). That is, the viewpoint control section 52 determines, according to the positions of the user and the information provider in the real space that are acquired by the real space information acquisition section 58, the position of the viewpoint and the line of sight thereof where the user 10 and the outside person 12 come within the field of view.

At this time, the image generation section 54 arranges, in the virtual space to be displayed, the objects representing, respectively, the user and the information provider, in such a manner that the objects correspond to the positions of the user and the information provider in the real space. It should be noted that the user and the information provider may have moved or changed their positions during an image display period from the other person's viewpoint, the image generation section 54 reflects such changes or movements in the movements of the objects. Also, the object of the information provider may be arranged in the virtual space regardless of whether the viewpoint is located at the user's viewpoint or the other person's viewpoint.

Next, the viewpoint control section 52 moves the viewpoint from the user's viewpoint where the viewpoint has been located up to then to the determined other person's viewpoint at a given speed, and the image generation section 54 generates, at a given rate, the images from the viewpoints in movement on the route and outputs these images from the output section 56 (S18). The route for moving the viewpoint from the user's viewpoint to the other person's viewpoint may be a straight line connecting these two points in the virtual space or a curve determined in accordance with a given rule. At this time, it is possible to move the viewpoint from the user's viewpoint to the other person's viewpoint smoothly by gradually changing the direction of the line of sight.

When the viewpoint reaches the other person's viewpoint, the viewpoint control section 52 stops moving the viewpoint there. Then, the image generation section 54 generates the image from the viewpoint in question and outputs the image from the output section 56 (S20). This allows the space including the user himself or herself to be visually recognized as illustrated in (b) of FIG. 7. As a result, the user can understand the information provider and the position and direction indicated by the information provider in the positional relation relative to the object of user himself or herself.

While the operation for terminating the display from the other person's viewpoint is yet to be performed (N in S22), the display image from the viewpoint in question continues to be generated and output (S18). In the case where the user, the information provider, and the position and direction indicated by the information provider move during this time period, the viewpoint control section 52 may adjust the position of the other person's viewpoint and the direction of the line of sight as appropriate in such a manner as to keep them within the field of view. Then, when the operation for terminating the display from the other person's viewpoint is accepted via the input apparatus 24 (Y in S22), the viewpoint control section 52 moves the viewpoint from the other person's viewpoint to the user's viewpoint at the given speed.

Then, the image generation section 54 generates the images from the viewpoints during the movement and outputs the images from the output section 56 (S24). Then, when the viewpoint reaches the user's viewpoint, the viewpoint control section 52 stops moving the viewpoint there. The display image from the user's viewpoint continues to be generated and output (S10 and S12) unless it becomes necessary to terminate the image display (N in S26). From here onwards, the processes from S10 to S24 are repeated while at the same time branching is caused as appropriate, and all the processes are terminated if it becomes necessary to terminate the image display (Y in S26).

According to the present embodiment described above, the viewpoint is moved to a position different from the user's viewpoint, and the image as seen from there is displayed according to need to provide information from outside during image display using the head-mounted display. The viewpoint at a destination is determined in such a manner that the space representing the real space and including at least one of the user, the information provider, and the position and direction indicated by the information provider is included. This allows the user to easily understand what is going on outside and instructions even when he or she is wearing the shielded head-mounted display which makes it impossible to see what is going on outside.

For example, even if merely the positional relation between oneself and the information provider becomes clear, it is possible for one to understand which directions "right" and "left" specified by the information provider are to oneself. Also, it is possible for one to more intuitively tell the directions as seen from oneself by including the direction indicated by the information provider in the display. It also becomes easier to not only indicate the directions but also make a motion according to a gesture made by the information provider.

Further, it is possible, by displaying the images on the movement route of the viewpoint and causing the images to gradually transition, to easily tell the positional relation between two types of worlds, i.e., the image originally seen and the real space, which would otherwise be incompatible with each other. One can also intuitively understand the direction to face relative to the original image. It is possible to prevent the user from losing sight of the target of interest or feel motion sickness by allowing the user himself or herself to determine when to start moving the viewpoint. These modes can be realized with the head-mounted display being worn, thus making it possible to easily communicate with an outside world without spending time and effort.

The embodiment of the present invention has been described above. It is understood by a person skilled in the art that the embodiment is an example, that the combination of the components and processes can be modified in various ways, and that these modification examples also fall within the scope of the present invention.

INDUSTRIAL APPLICABILITY

As described above, the present invention is applicable to various apparatuses such as a head-mounted display and an image generation apparatus, systems including such apparatuses, and the like.

REFERENCE SIGNS LIST

22: Sensor
24: Input apparatus
50: Viewpoint information acquisition section
52: Viewpoint control section
54: Image generation section
56: Output section
58: Real space information acquisition section
60: Image data storage section
100: Head-mounted display
200: Image generation apparatus
222: CPU
224: GPU
226: Main memory
236: Output section
238: Input section

The invention claimed is:

1. An image generation apparatus comprising:
a viewpoint information acquisition section adapted to acquire, on a basis of movement of a head of a user wearing a head-mounted display, information regarding a viewpoint of the user;
a real space information acquisition section adapted to acquire, on a basis of information from a sensor that detects a state of a real space where the user is present, information regarding the state of the real space in which the user is located;
a viewpoint control section adapted to control a viewpoint used for generating an image displayed on the head-mounted display, where the image includes objects of a virtual space;
an image generation section adapted to generate the image representing a target in a field of view corresponding to the viewpoint, the image to be displayed on the head-mounted display; and
an output section adapted to output the generated image to the head-mounted display, wherein:
in response to control inputs from the user, the viewpoint control section controllably moves the viewpoint, and the image generation section consequently changes the image based on the moved viewpoint: (i) from the user's viewpoint to another person's viewpoint that is different from the user's viewpoint, and (ii) from the other person's viewpoint back to the user's viewpoint,
when the viewpoint moves from the user's viewpoint to the other person's viewpoint, the image that is displayed to the user changes from a state in which an object representing the user in the real space does not appear in the field of view to a state in which the object representing the user appears in the field of view along with the objects of the virtual space, and
the viewpoint control section further determines, as the other person's viewpoint, a viewpoint where a position or direction indicated by the information provider comes within the field of view, and the image generation section arranges a graphics representing the position or direction in the space to be displayed and generates an image representing the space to be displayed in the field of view corresponding to the other person's viewpoint.

2. The image generation apparatus of claim 1, wherein the viewpoint control section determines, as the other person's viewpoint, a viewpoint where both the user and an information provider of the user come within the field of view, and the image generation section arranges the object representing the user and an object representing the information provider in a space to be displayed, on a basis of the information regarding the state of the real space, and generates an image representing the space to be displayed in the field of view corresponding to the other person's viewpoint.

3. The image generation apparatus of claim 2, wherein the image generation section generates a virtual world as the space to be displayed, and the viewpoint control section determines, as the other person's viewpoint, a viewpoint where neither the user nor the information provider is hidden by objects represented in the virtual world.

4. The image generation apparatus of claim 2, wherein the viewpoint control section determines the other person's viewpoint to be located on a line passing through the user and the information provider or in a region within a given range from the line, in the space to be displayed.

5. The image generation apparatus of claim 2, wherein, in a case where the information provider is included in a field of view when the viewpoint relative to the image to be displayed is located at the user's viewpoint, the viewpoint control section determines the other person's viewpoint to be located on a line that vertically bisects a line segment connecting the user and the information provider or in a region within a given range from the line, in the space to be displayed.

6. The image generation apparatus of claim 1, wherein the viewpoint control section establishes a time period in which a viewpoint relative to the image is moved from the user's viewpoint to the other person's viewpoint, and
the image generation section sequentially generates the images representing the target to be displayed in the fields of view corresponding to the viewpoints during the movement, during the time period.

7. The image generation apparatus of claim 2, wherein the viewpoint control section moves the viewpoint according to operation performed by the user via an input apparatus.

8. The image generation apparatus of claim 2, wherein the viewpoint control section moves the viewpoint according to operation performed by the information provider of the user via an input apparatus.

9. The image generation apparatus claim 1, wherein the viewpoint control section adjusts the other person's viewpoint according to a change in the state of the real space.

10. The image generation apparatus of claim 1, wherein the image generation section includes, in an image to be generated, a surface of an image displayed from the user's viewpoint even after the viewpoint relative to the image has been moved from the user's viewpoint.

11. An information presentation method comprising:
acquiring, on a basis of movement of a head of a user wearing a head-mounted display, information regarding a viewpoint of the user;
acquiring, on a basis of information from a sensor that detects a state of a real space where the user is present, information regarding the state of the real space in which the user is located;
controlling a viewpoint used for generating an image displayed on the head-mounted display, where the image includes only objects of a virtual space;
generating the image representing a target to be displayed in a field of view corresponding to the viewpoint on the head-mounted display; and
outputting the generated image to the head-mounted display, wherein:
the controlling the viewpoint includes, in response to control inputs from the user, controllably moving the viewpoint, and the image generation section consequently changes the image based on the moved viewpoint: (i) from the user's viewpoint to another person's viewpoint that is different from the user's viewpoint, and (ii) from the other person's viewpoint back to the user's viewpoint,
when the viewpoint moves from the user's viewpoint to the other person's viewpoint, the image that is displayed to the user changes from a state in which an object representing the user in the real space does not appear in the field of view to a state in which the object representing the user appears in the field of view along with the objects of the virtual space, and
the controlling includes determining, as the other person's viewpoint, a viewpoint where a position or direction indicated by the information provider comes within the field of view, and the generating includes arranging a graphics representing the position or direction in the space to be displayed, and generating an image representing the space to be displayed in the field of view corresponding to the other person's viewpoint.

12. A non-transitory, computer readable storage medium containing a computer program, which when executed by a computer, causes the computer to perform an information presentation method by carrying out actions, comprising:
acquiring, on a basis of movement of a head of a user wearing a head-mounted display, information regarding a viewpoint of the user;
acquiring, on a basis of information from a sensor that detects a state of a real space where the user is present, information regarding the state of the real space in which the user is located;
controlling a viewpoint used for generating an image displayed on the head-mounted display, where the image includes only objects of a virtual space;
generating the image representing a target to be displayed in a field of view corresponding to the viewpoint on the head-mounted display; and
outputting the generated image to the head-mounted display, wherein:
the controlling the viewpoint includes, in response to control inputs from the user, controllably moving viewpoint, and the image generation section consequently changes the image based on the moved viewpoint: (i) from the user's viewpoint to another person's viewpoint that is different from the user's viewpoint, and (ii) from the other person's viewpoint back to the user's viewpoint,
when the viewpoint moves from the user's viewpoint to the other person's viewpoint, the image that is displayed to the user changes from a state in which an object representing the user in the real space does not appear in the field of view to a state in which the object representing the user appears in the field of view along with the objects of the virtual space, and
the controlling includes determining, as the other person's viewpoint, a viewpoint where a position or direction indicated by the information provider comes within the field of view, and the generating includes arranging a graphics representing the position or direction in the space to be displayed, and generating an image representing the space to be displayed in the field of view corresponding to the other person's viewpoint.

* * * * *